(12) United States Patent
Hashimoto et al.

(10) Patent No.: US 6,783,297 B2
(45) Date of Patent: Aug. 31, 2004

(54) SHIFT LEVER BUSH

(75) Inventors: Osamu Hashimoto, Kurashiki (JP); Yoshihito Hiraiwa, Anjo (JP); Kenji Nishikawa, Anjo (JP)

(73) Assignees: Kurashiki Kako Co., Ltd. (JP); Mannoh Kogyo Co., Ltd. (JP)

( * ) Notice: Subject to any disclaimer, the term of this patent is extended or adjusted under 35 U.S.C. 154(b) by 92 days.

(21) Appl. No.: 10/052,489

(22) Filed: Jan. 23, 2002

(65) Prior Publication Data

US 2002/0124675 A1 Sep. 12, 2002

(30) Foreign Application Priority Data

Jan. 25, 2001 (JP) .................................. 2001-016741

(51) Int. Cl.$^7$ ................................................. F16D 1/00
(52) U.S. Cl. ....................... 403/225; 403/220; 403/221; 403/226; 403/228; 74/473.29; 74/543
(58) Field of Search ......................... 403/33, 220, 221, 403/225, 226, 228, 291, 365, 359.1, 359.2, 359.3, 359.4, 359.5, 359.6; 74/473.29, 473.32, 473.33, 543, 523, 528, 544, 545, 473.1, 473.3; 464/75, 89, 160

(56) References Cited

U.S. PATENT DOCUMENTS

| | | | | |
|---|---|---|---|---|
| 1,636,262 A | * | 7/1927 | Troendly | ................. 403/359.5 |
| 3,800,909 A | * | 4/1974 | Duncanson et al. | ..... 74/473.29 |
| 4,569,246 A | * | 2/1986 | Katayama et al. | ........ 74/473.29 |
| 4,603,598 A | * | 8/1986 | Tsuji et al. | ............... 74/473.29 |
| 5,467,664 A | * | 11/1995 | Wehner | .................... 74/473.29 |

FOREIGN PATENT DOCUMENTS

| | | | | |
|---|---|---|---|---|
| JP | 04-124520 | | 11/1992 | |
| JP | 08014375 A | * | 1/1996 | ........... F16H/59/10 |
| JP | 10151955 A | * | 6/1998 | ........... B60K/20/02 |
| JP | 10175457 A | * | 6/1998 | ........... B60K/20/02 |
| JP | 11011173 A | * | 1/1999 | ........... B60K/20/02 |
| JP | 11048811 A | * | 2/1999 | ........... B60K/20/02 |
| JP | 2000291789 A | * | 10/2000 | ........... F16H/59/04 |

* cited by examiner

Primary Examiner—Victor MacArthur
(74) Attorney, Agent, or Firm—Nixon Peabody, LLC; Donald R. Studebaker

(57) ABSTRACT

A projecting portion 52 which becomes convex in radial direction is formed in a rubber elastic body 5 for connecting together an inner cylindrical body 3 mounted to a shaft portion 21a of a lower shift lever member 21 by external interfit and an outer cylindrical body 4 mounted to a cylindrical portion 22a of an upper shift lever member 22 by internal interfit. Formed in an inner peripheral surface of the outer cylindrical body 4 is a recessed portion 42 which becomes concave with clearances C1 and C2 of respective given amounts left between the recessed portion 42 and the projecting portion 52. This makes it possible to manufacture a shift lever bush 1 having a two-stage spring characteristic at low cost.

2 Claims, 3 Drawing Sheets

SHIFT LEVER BUSH

BACKGROUND OF THE INVENTION

1. Field of the Invention

The present invention relates to a shift lever bush which is mounted between a shaft portion formed in one of a pair of axially two-piece-divided shift lever members and a cylindrical portion formed in the other shift lever member.

2. Description of the Prior Art

There is a previously known shift lever bush of the type which is mounted between a shaft portion formed in one of a pair of axially (substantially vertically) two-piece-divided shift lever members (for example one located on the transmission side) and a cylindrical portion formed in the other shift lever member (for example another located on the shift knob side). This type of shift lever bush is intended for preventing the transfer of vibrations from the transmission side to the shift knob side.

For example, Japanese Utility Model Registration No. 2569721 Gazette discloses a shift lever bush. This shift lever bush includes: an inner cylindrical body which is mounted to a shaft portion of one of shift lever members by external interfit; an outer cylindrical body which is so disposed substantially coaxially with the cylinder axis of the inner cylindrical body as to surround an outer peripheral surface of the inner cylindrical body and which is mounted to a cylindrical portion of the other shift lever member by internal interfit; and a rubber elastic body, disposed between the inner cylindrical body and the outer cylindrical body, for connecting together these inner and outer cylindrical bodies. In the shift lever bush disclosed in the aforementioned gazette, the rubber elastic body is provided with an annular groove portion which opens to its cylinder axis direction end surface, which groove portion interfits with an annular stopper member. Further, a recessed portion is formed in a peripheral lateral surface of the groove portion on the outer cylindrical body side and, in addition, a projecting portion engageable with the recessed portion is formed in the stopper member. There is defined a clearance of a given amount between these projecting and recessed portions. Because of such arrangement, when the shift lever member on the shift knob side receives an operation load caused by a shift operation or select operation of the shift lever, relative displacement between the inner cylindrical body and the outer cylindrical body will not be regulated until the recessed portion of the groove portion and the projecting portion of the stopper member abut with each other. However, after the recessed portion and the projecting portion have engaged with each other, both relative displacement between the inner cylindrical body and the outer cylindrical body around the cylinder axis (displacement in the torsional direction) and relative displacement between the inner cylindrical body and the outer cylindrical body in a radial direction rectangular to the cylinder axis (displacement in the direction rectangular to the cylinder axis) are limited. Therefore, the spring characteristic of the shift lever bush disclosed in the aforementioned gazette is a two-stage characteristic for the torsional direction and for the direction rectangular to the cylinder axis with respect to its displacement amount.

However, in addition to the inner cylindrical body, the outer cylindrical body, and the rubber elastic body, the shift lever bush of the aforementioned gazette further requires the stopper member in order that its spring characteristic may have a two-stage characteristic, which results in the increase in component count. Besides, in this conventional shift lever bush, there is provided a stopper mechanism for placing and fixing the stopper member within the groove portion. This makes the construction complicated. As a result, the shift lever bush of the aforementioned gazette suffers inconveniences such as the increase in component count which results in the increase in manufacturing cost.

Further, the manufacture of the shift lever bush shown in the aforesaid gazette requires: firstly a step of performing integral vulcanization molding of the inner cylindrical body, the outer cylindrical body, and the rubber elastic body; a step of inserting, after locating the recessed portion of the groove portion and the projecting portion of the stopper member so as to circumferentially conform with each other, the stopper member into the groove portion; and a step of bending an opening edge of the inner cylindrical body and then bringing the opening edge portion into abutment with the stopper member to provide a stopper mechanism. Each step is extremely complicated and, besides, the number of steps is large, therefore producing such inconvenience that the manufacturing cost increases.

Bearing in mind the above-described circumstances, the present invention was made. Accordingly, an object of the present invention is to make it possible to manufacture a shift lever bush having a two-stage spring characteristic at lower cost.

SUMMARY OF THE INVENTION

In order to achieve the object, a first invention of the present application discloses a shift lever bush mounted between a shaft portion formed in one of a pair of axially two-piece-divided shift lever members and a cylindrical portion formed in the other of the pair of shift lever members. The shift lever bush of the first invention comprises: an inner cylindrical body mounted to the shaft portion of the one shift lever member by external interfit, an outer cylindrical body disposed substantially coaxially with a cylinder axis of the inner cylindrical body so as to surround an outer peripheral surface of the inner cylindrical body, and mounted to the cylindrical portion of the other shift lever member by internal interfit; and a rubber elastic body, fixedly attached to the outer peripheral surface of the inner cylindrical body, for connecting together the inner and outer cylindrical bodies. Further, an interfit fixing portion which is fixed to an inner peripheral surface of the outer cylindrical body by internal interfit and at least one projecting portion which becomes radially convex from the inner cylindrical body toward the outer cylindrical body are formed in the rubber elastic body, wherein the interfit fixing portion and the projecting portion are located at different positions in the cylinder axis direction, and a recessed portion, which becomes concave correspondingly to the shape of the projecting portion with a clearance of a given amount left between the recessed portion and the projecting portion, is formed at a position of the inner peripheral surface of the outer cylindrical body corresponding to the position of the projecting portion.

As a result of such arrangement, the inner cylindrical body mounted, by external interfit, to the shaft portion of one of the pair of shift lever members and the outer cylindrical body mounted, by internal interfit, to the cylindrical portion of the other shift lever member are interconnected at the interfit fixing portion formed in the rubber elastic body. Therefore, relative displacement between the inner cylindrical body and the outer cylindrical body in the cylinder axis direction is regulated by the interfit fixing portion.

Accordingly, the spring characteristic of the shift lever bush in the cylinder axis direction becomes soft by making the length of the interfit fixing portion in the cylinder axis direction relatively short. As a result of making the spring characteristic of the shift lever bush in the cylinder axis direction soft, it becomes possible to impede the transfer of vibrations from the transmission side to the shift knob side, thereby achieving an excellent vibration proof effect.

On the other hand, when the shift lever member on the shift knob side receives an operation load caused by a shift operation or select operation of the shift lever, the inner cylindrical body and the outer cylindrical body will relatively rotate about the cylinder axis (the inner cylindrical body and the outer cylindrical body are twisted relative to each other) or will relatively be displaced in the radial direction rectangular to the cylinder axis.

At this time, with regard to the torsional direction, since there is defined a clearance of a given amount between the projecting portion of the rubber elastic body and the recessed portion of the outer cylindrical body, the inner cylindrical body and the outer cylindrical body relatively rotate about the cylinder axis by a corresponding angle to the clearance, with little resistance. This provides a soft initial spring characteristic. Thereafter, the projecting portion and the recessed portion engage with each other, thereby producing a hard spring characteristic. Accordingly, the shift lever bush exhibits a two-stage spring characteristic in the torsional direction.

On the other hand, also with regard to the radial direction, because of a clearance of a given amount defined between the projection portion and the recessed portion, at the positions where the projecting portion and the recessed portion are formed the inner cylindrical body and the outer cylindrical body are displaced relative to each other by a corresponding radial distance to the clearance with little resistance. This provides a soft initial spring characteristic. Thereafter, the projecting portion and the recessed portion abut with each other, thereby providing a hard spring characteristic. Further, with regard to a position circumferentially different from the formation positions of the projecting and recessed portions in the shift lever bush, there is defined a clearance of a given amount between the outer peripheral surface of the rubber elastic body and the inner peripheral surface of the outer cylindrical body. As a result of such arrangement, the inner cylindrical body and the outer cylindrical body are displaced relative to each other by a corresponding radial distance to the given-amount clearance with little resistance. This provides a soft initial spring characteristic. Thereafter, the outer peripheral surface of the rubber elastic body and the inner peripheral surface of the outer cylindrical body abut each other, thereby providing a hard spring characteristic. In this way, at any circumferential position, the spring characteristic of the shift lever bush for the radial direction is a two-stage characteristic.

As described above, the spring characteristic of the shift lever bush both for the torsional direction and for the radial direction becomes a two-stage characteristic, thereby providing improved operation feelings of the shift lever. Further, by virtue of the formation of the projecting portion of the rubber elastic body and the formation of the recessed portion of the outer cylindrical body, the spring characteristic of the shift lever bush according to the present invention has a two-stage characteristic. Because of this, the number of components required can be reduced and the construction becomes simplified, thereby reducing the cost of manufacture.

In a second invention according to the first invention, the recessed portion of the outer cylindrical body is formed by a pair of recesses which are circumferentially spaced from each other by a given distance in the outer peripheral surface of the outer cylindrical body and which are so recessed as to respectively project toward the inner peripheral surface of the outer cylindrical body and the inner cylindrical body is inserted to the inside of the outer cylindrical body, with the rubber elastic body fixedly mounted to the inner cylindrical body, and wherein during the insertion the interfit fixing portion of the rubber elastic body is interfittingly fixed, by press fit, to the inner peripheral surface of the outer cylindrical body. Further, the interfit fixing portion is formed at an end of the rubber elastic body on the side of a base end thereof in the direction of the insertion of the inner cylindrical body into the outer cylindrical body and an introduction portion, which becomes radially convex from the inner cylindrical body toward the outer cylindrical body and the amount of projection of which is smaller than that of the projecting portion, is formed at a position of the rubber elastic body located nearer to the side of a leading end of the inner cylindrical body in the insertion direction than the projecting portion.

In accordance with such arrangement, when manufacturing a shift lever bush of the present invention, the inner cylindrical body is placed in the inside of the outer cylindrical body, with the rubber elastic body fixedly mounted to the inner cylindrical body and, in addition, the interfit fixing portion of the rubber elastic body is press fitted into the inner peripheral surface of the outer cylindrical body. The inner cylindrical body and the outer cylindrical body are assembled together, only by these steps. This provides a simpler manufacturing process in comparison with prior art manufacturing processes. Also, the number of steps required is reduced, thereby reducing the cost of manufacture.

Further, the introduction portion is formed at a position of the rubber elastic body located nearer to the side of the leading end of the inner cylindrical body in the insertion direction than the projecting portion. Because of such arrangement, when assembling together the inner cylindrical body and the outer cylindrical body, the circumferential location of the projecting portion and that of the recessed portion automatically coincide, just by inserting the inner cylindrical body in the outer cylindrical body with the introduction portion in agreement in circumferential position with the recessed portion of the outer cylindrical body. This facilitates, when assembling together the inner cylindrical body and the outer cylindrical body, circumferential location of the inner cylindrical body and the outer cylindrical body. Therefore, the manufacture of a shift lever bush is further simplified, thereby reducing the cost of manufacture to a further extent. Further, the amount of projection of the introduction portion is set smaller than the amount of projection of the projecting portion. As a result of such setting, when placing the inner cylindrical body in the inside of the outer cylindrical body, the introduction portion is allowed to easily pass between a pair of recesses forming the recessed portion in the direction of the cylinder axis. This facilitates not only circumferential location of the inner cylindrical body and the outer cylindrical body but also assembly of the inner cylindrical body and the outer cylindrical body.

Further, the recessed portion of the outer cylindrical body comprises a pair of recesses which are so formed in the outer peripheral surface of the outer cylindrical body as to project toward the inner peripheral surface of the outer cylindrical body. This facilitates formation of the outer cylindrical body and reduces the cost of manufacture to a further extent.

DESCRIPTION OF THE PREFERRED EMBODIMENT

Figure 1:
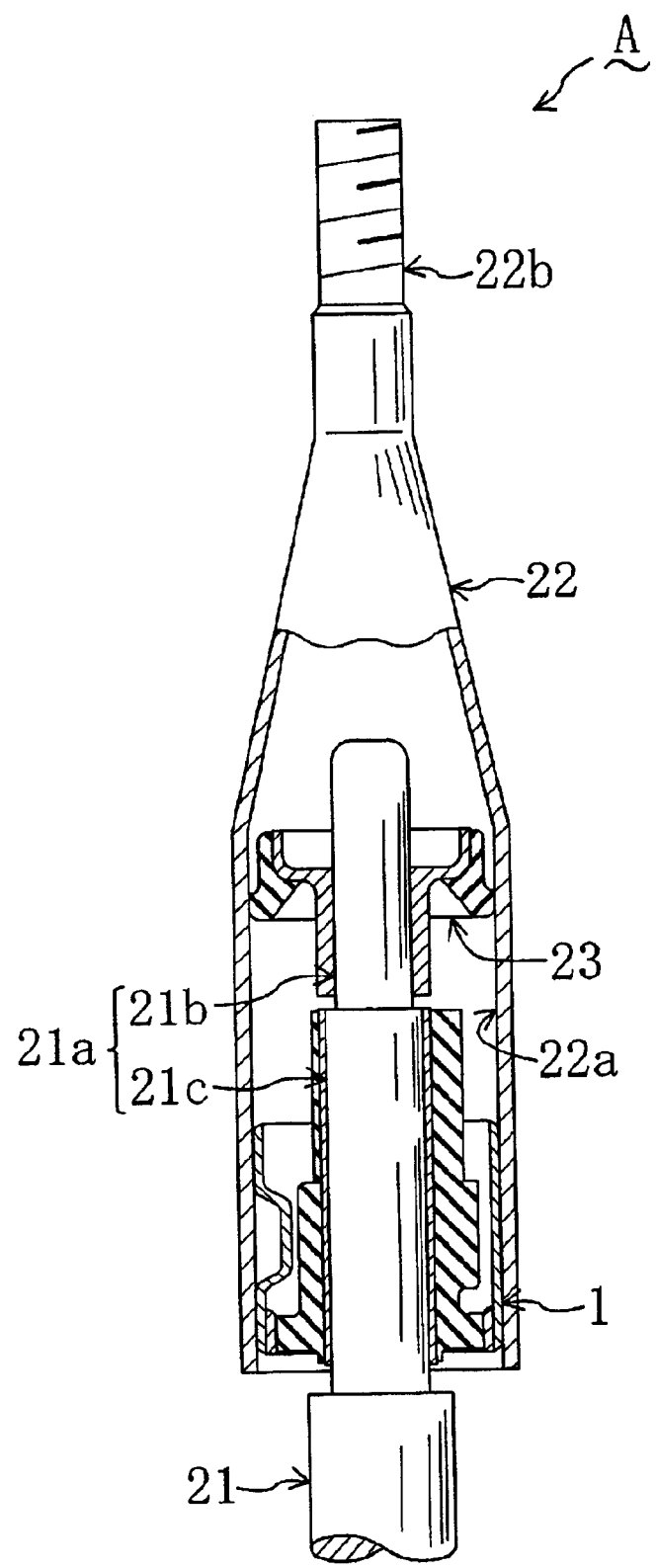
FIG. 1 is a longitudinal cross-sectional view showing part of a shift lever provided with a shift lever bush according to an embodiment of the present invention.
Figure 2:
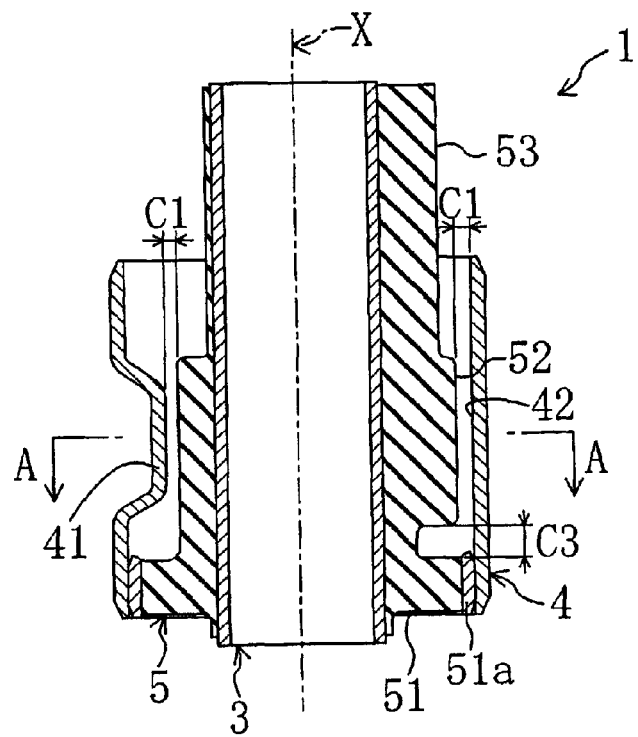
FIG. 2 is a cross-sectional view showing a line B—B cross-section of FIG. 3.
Figure 3:
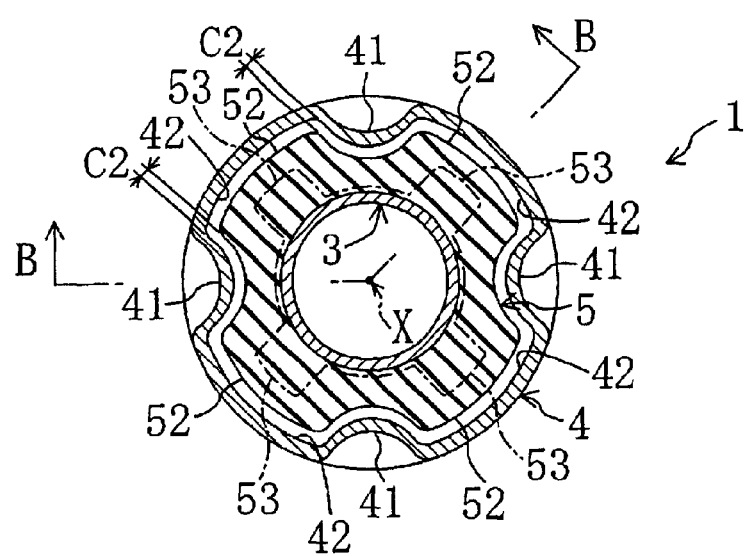
FIG. 3 is a transverse cross-sectional view of the shift lever bush.

Referring to the accompanying drawings, an exemplary embodiment of the present invention will be described. FIG. 1 shows a shift lever A provided with a shift lever bush 1 according to the embodiment of the present invention. The shift lever A of the present embodiment comprises a pair of axially (vertically) two-piece-divided shift lever members, namely a lower (transmission side) shift lever member 21 and an upper (shift knob side) shift lever member 22. Formed at the top of the lower shift lever member 21 is a shaft portion 21a having a circular cross-section. On the other hand, formed at the bottom of the upper shift lever member 22 is a cylindrical portion 22a shaped like a cylinder surrounding an outer peripheral surface of the shaft portion 21a of the lower shift lever member 21. The shaft portion 21a is made up of a smaller-diameter portion 21b constituting an upper end portion and a greater-diameter portion 21c underlying the smaller-diameter portion 21b. The smaller-diameter portion 21b is connected, through a damper member 23 interfittingly inserted into the smaller-diameter portion 21b, to the cylindrical portion 22a of the upper shift lever member 22. On the other hand, the greater-diameter portion 21c is connected, through the shift lever bush 1, to the cylindrical portion 22a. Further, formed at the upper end of the upper shift lever member 22 is a threaded portion 22b onto which a shift knob (not shown) is attached by thread engagements Referring now to FIGS. 2 and 3, the shift lever bush 1 includes: an inner cylindrical body 3 made of metal; an outer cylindrical body 4 made of metal which is disposed substantially coaxially with the cylinder axis X of the inner cylindrical body 3 (note that the cylinder axis X corresponds to each axis of the shift lever members 21 and 22) so as to surround an outer peripheral surface of the inner cylindrical body 3; and a rubber elastic body 5 by which the inner cylindrical body 3 and the outer cylindrical body 4 are connected together. The inner cylindrical body 3 is fixedly attached to the greater-diameter portion 21c of the shaft portion 21a of the lower shift lever member 21 by external interfit, whereas the outer cylindrical body 4 is fixedly attached to the cylindrical portion 22a of the upper shift lever member 22 by internal interfit.

The rubber elastic body 5 is formed by integral vulcanization molding with respect to the outer peripheral surface of the inner cylindrical body 3. Formed at the lower-end of the rubber elastic body 5 in the cylinder axis X direction is an interfit fixing portion 51. This interfit fixing portion 51 is constructed as follows. That is, the interfit fixing portion 51 is so formed as to radially project from the inner cylindrical body 3 toward the outer cylindrical body 4 over the entire periphery of the inner cylindrical body 3. Further, the interfit fixing portion 51 is fixed, by internal interfit, to the inner peripheral surface of the outer cylindrical body 4 through an outer ring 51a made of metal. This interfit fixing portion 51 regulates relative displacement between the inner cylindrical body 3 and the outer cylindrical body 4 for the cylinder axis X direction, and relative rotation between the inner cylindrical body 3 and the outer cylindrical body 4 about the cylinder axis X.

Formed above the interfit fixing portion 51 of the rubber elastic body 5 in the cylinder axis X are four projecting portions 52 circumferentially equally spaced and becoming radially convex from the inner cylindrical body 3 toward the outer cylindrical body 4. Defined in the cylinder axis X between the lower end of each projecting portion 52 and the interfit fixing portion 51 is a clearance C3 of a given amount.

Formed in an area extending from the cylinder axis direction upper end surface of each projecting portion 52 of the rubber elastic body 5 to the upper end of the inner cylindrical body 3 is an introduction portion 53 becoming radially convex from the inner cylindrical body 3 toward the outer cylindrical body 4. The circumferential width of each introduction portion 53 is smaller than that of each projecting portion 52. Further, the amount of radial projection of each introduction portion 53 is set smaller than that of each projecting portion 52, and each introduction portion 53 is so formed as to radially project beyond the position of an inner peripheral surface of a recess 41 (which will be described later) of the outer cylindrical body 4. That is, the amount of projection of each introduction portion 53 is set greater than the distance between the inner peripheral surface of the recess 41 of the outer cylindrical body 4 and the outer peripheral surface of the inner cylindrical body 3.

There are four, recesses 41, 41, 41, and 41 which are substantially centrally formed in the outer peripheral surface of the outer cylindrical body 4 in the cylinder axis X direction, and each recess 41 is so recessed, as to project toward the inner peripheral surface of the outer cylindrical body 4. Each recess 41 is so formed as to be located between a pair of adjacent projecting portions 52 and 52 formed in the rubber elastic body 5. By a pair of circumferentially adjacent recesses 41 and 41, a recessed portion 42 which becomes concave correspondingly to the shape of each projecting portion 52 is defined in the inner peripheral surface of the outer cylindrical body 4. Defined between each projecting portion 52 and each recessed portion 42 are a clearance C1 of a given amount for the radial direction and a clearance C2 of a given amount for the circumferential direction. In addition, a clearance C1 of a given amount is defined in the radial direction also between the inner peripheral surface of the outer cylindrical body 4 and the outer peripheral surface of the rubber elastic body 5 in the area of each recess 41.

Figure 4:
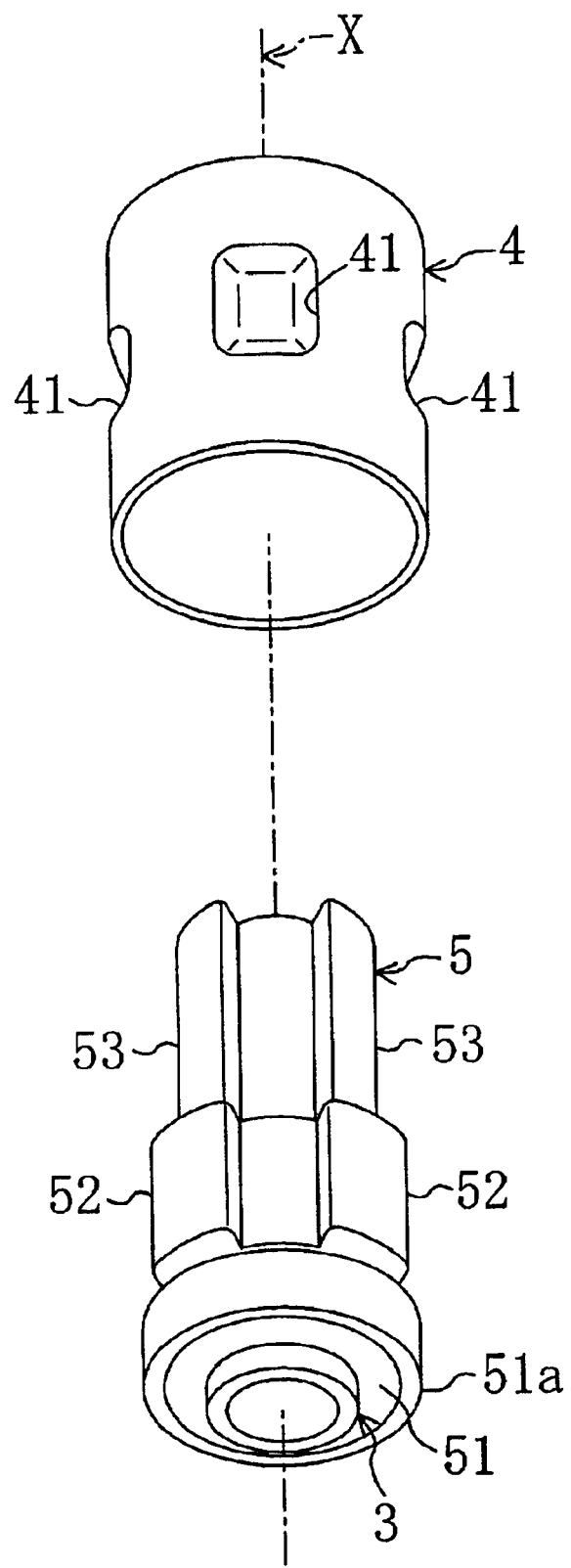
FIG. 4 is an exploded perspective view of the shift lever bush.

Next, a process of manufacturing the shift lever bush 1 will be described. As shown in FIG. 4, firstly integral molding of the inner cylindrical body 3 and the outer ring 51a with respect to the rubber elastic body 5 is carried out by vulcanization.

Thereafter, the inner cylindrical body 3 is inserted to the inside of the outer cylindrical body 4 provided with the four recesses 41, 41, 41, and 41 from the formation side of the introduction portion 53 of the rubber elastic body 5. At this time, circumferential location of the inner cylindrical body 3 and the outer cylindrical body 4 is carried out so that the introduction portion 53 passes between a pair of adjacent recesses 41 and 41. Because of this, when the inner cylindrical body 3 is inserted to the inside of the outer cylindrical body 4, the circumferential position of the projecting portion 52 of the rubber elastic body 5 and that of the recessed portion 42 of the outer cylindrical body 4 automatically coincide with each other.

Thereafter, the interfit fixing portion 51 of the rubber elastic body 5 is press fitted, through the outer ring 51a, into the lower end of the inner peripheral surface of the outer cylindrical body 4. Because of this, the shift lever bush 1, made up of the inner cylindrical body 3, the outer cylindrical body 4, and the rubber elastic body 5 connecting together these cylindrical bodies 3 and 4, is manufactured.

In the shift lever bush 1 of the type as described above, relative displacement between the inner cylindrical body 3 and the outer cylindrical body 4 in the cylinder axis direction X is regulated by the interfit fixing portion 51 of the rubber elastic body 5, when the shift lever A is in its non-operation state. This provides a soft spring characteristic, and transfer of vibrations of the shaft portion 21a of the lower shift lever member 21 (particularly, frequently occurring slight vibrations of the lower shift lever member 21 for the cylinder axis X direction) to the upper shift lever member 22 is effectively prevented, thereby making it possible to enhance the effect of vibration proof.

Now a case, in which the upper shift lever member 22 receives an operation load caused by a shift operation or select operation of the shift lever A thereby to result in upward relative displacement between the outer cylindrical body 4 and the inner cylindrical body 3, will be discussed. In this case, the rubber elastic body 5 is compressed in the cylinder axis X direction. In the shift lever bush 1, the clearance C3 of a given amount is defined between the lower end surface of the projecting portion 52 and the top surface of the interfit fixing portion 51. Because of this, the outer cylindrical body 4 is allowed to undergo relative displacement to the inner cylindrical body 3 by a corresponding distance to the clearance C3 for the cylinder axis X direction, with little resistance. This provides a soft initial spring characteristic. Thereafter, the lower end surface of the projecting portion 52 engages with the top surface of the interfit fixing portion 51. In this way, deformation of the rubber elastic body 5 in the cylinder axis X direction is regulated. Accordingly, it is possible to prevent the rubber elastic body 5 from being damaged, even when a soft spring characteristic for the cylinder axis X direction is provided in order to enhance the effect of vibration proof. Further, the spring characteristic becomes hard when the lower end surface of the projecting portion 52 and the top surface of the interfit fixing portion 51 engage with each other. In this way, the spring characteristic of the shift lever bush 1 has a two-stage characteristic, thereby making it possible to provide improved shift operation feelings and select operation feelings.

Next, another case, in which the upper shift lever member 22 receives an operation load thereby to result in causing the inner cylindrical body 3 and the outer cylindrical body 4 to be twisted relative to one another around the cylinder axis X. In this case, the clearance C2 of a given amount is defined between the projection portion 52 of the rubber elastic body 5 and the recessed portion 42 of the outer cylindrical body 4, for the circumference direction. This allows the inner cylindrical body 3 and the outer cylindrical body 4 to be rotated relative to each other by a corresponding angle to the clearance C2, with little resistance. This provides a soft initial spring characteristic. Thereafter, the projecting portion 52 and the recessed portion 42 engage with each other. This regulates deformation of the rubber elastic body 5 a round the cylinder axis X, thereby making it possible to prevent the rubber elastic body 5 from being damaged. Further, engagement between the projecting portion 52 and the recessed portion 42 provides a hard spring characteristic. In this way, the spring characteristic of the shift lever bush 1 for the torsional direction exhibits a two-stage characteristic, thereby providing-improved shift operation feelings and select operation feelings.

Finally, a case, in which the upper shift lever member 22 receives an operation load thereby to result in causing the inner cylindrical body 3 and the outer cylindrical body 4 to be displaced relative to each other in the radial direction, will be discussed. In this case, in positions where the projecting portion 52 and the recessed portion 42 of the shift lever bush 1 are formed the clearance C1 of a given amount is defined between the radially-facing outer peripheral surface of the projecting portion 52 and the radially-facing inner peripheral surface of the recessed portion 42. This allows the inner cylindrical body 3 and the outer cylindrical body 4 to be displaced relative to each other by a corresponding distance to the clearance C1, with little resistance. This provides a soft initial spring characteristic. Thereafter, the outer peripheral surface of the projecting portion 52 and the inner peripheral surface of the recessed portion 42 abut with each other, thereby providing a hard spring characteristic. Further, in a position circumferentially different from the formation positions of the projecting portion 52 and the recessed portion 42 of the shift lever bush 1 (i.e., the position where the recess 41 of the outer cylindrical body 4 is formed), there is defined the clearance C1 between the outer peripheral surface of the rubber elastic body 5 and the inner peripheral surface of the outer cylindrical body 4 at the recess 41. This allows the inner cylindrical body 3 and the outer cylindrical body 4 to be displaced relative to each other in the radial direction by a corresponding distance to the clearance C1, with little resistance. This provides a soft initial spring characteristic. Thereafter, the outer peripheral surface of the rubber elastic body 5 and the inner peripheral surface of the outer cylindrical body 4 abut with each other, thereby providing a hard spring characteristic. This regulates radial deformation of the rubber elastic body 5, thereby making it possible to prevent the rubber elastic body 5 from being damaged. Further, the spring characteristic is a two-stage characteristic, thereby providing improved shift operation feelings and select operation feelings while making it possible to provide reliable shift and select operations.

As described above, the shift lever bush 1 according to the present embodiment has a two-stage spring characteristic both for the torsional direction and for the radial direction. Besides, the present shift lever bush 1 has a two-stage spring characteristic for the cylinder axis X direction. Further, the shift lever bush 1 requires a less number of components and its construction is simple accordingly. Because of these advantages, it is possible to reduce the cost of manufacture.

Further, as described above, the shift lever bush 1 is manufactured, just by insertion of the inner cylindrical body 3 with the rubber elastic body 5 integrally formed therewith by vulcanization, into the outer cylindrical body 4, and by press fit of the interfit fixing portion 51 into the inner peripheral surface of the outer cylindrical body 4. Therefore, the manufacturing process is simple and the number of manufacturing steps required is small, thereby making it possible to considerably reduce the cost of manufacture.

Further, the rubber elastic body 5 is provided with the introduction portion 53, which makes it possible to facilitate location of the inner cylindrical body 3 and the outer cylindrical body 4 when assembling these cylindrical bodies 3 and 4. This further facilitates manufacture of the shift lever bush 1, thereby making it possible to reduce manufacturing cost to a further extent. Furthermore, the introduction portion 53 is so formed as to be smaller in width and in the amount of projection in comparison with projecting portion 52. Because of such arrangement, when placing the inner cylindrical body 3 to the inside of the outer cylindrical body 4, the introduction portion 53 is allowed to easily pass between the pair of recesses 41 and 41 in the cylinder axis X direction. This therefore facilitates assembly of the inner cylindrical body 3 and the outer cylindrical body 4 to a further extent.

Additionally, the recessed portion 42 of the outer cylindrical body 4 is defined by a pair of recesses 41 and 41 which are formed in the outer peripheral surface of the outer cylindrical body 4 so as to project toward the inner peripheral surface of the outer cylindrical body 4. This facilitate formation of the outer cylindrical body 4, thereby making it possible to further reduce manufacturing cost.

The present invention is not limited to the aforementioned embodiment, but it includes various other embodiments. For example, the introduction portion 53 is provided for location of the inner cylindrical body 3 and the outer cylindrical body 4 when manufacturing the shift lever bush 1. That is, if location of the inner cylindrical body 3 and the outer cylindrical body 4 can be carried out by using any other method, the introduction portion 53 may be omitted.

Further, in the aforementioned embodiment the rubber elastic body 5 is provided with the four projecting portions 52 and the outer cylindrical body 4 is provided with the corresponding four recessed portions 42. Although the provision of at least one projecting portion 52 and the provision of its corresponding recessed portion 42 are sufficient, it is preferable that a plurality of projecting portions 52 and their corresponding recessed portions 42 be formed circumferentially at equal intervals in order to provide a stable two-stage spring characteristic for the torsional direction.

Further, the provision of the outer ring 51*a* for placing the interfit fixing portion 51 of the rubber elastic body 5 in the internally interfitting state with respect to the inner peripheral surface of the outer cylindrical body 4 may be omitted.

What is claimed is:

1. A shift lever bush mounted between a shaft portion formed in one of a pair of axially two-piece-divided shift lever members and a cylindrical portion formed in the other of said pair of shift lever members, said shift lever bush comprising:

an inner cylindrical body mounted to said shaft portion of said one shift lever member by external interfit, an outer cylindrical body disposed substantially coaxially with a cylinder axis of said inner cylindrical body so as to surround an outer peripheral surface of said inner cylindrical body, and mounted to said cylindrical portion of said other shift lever member by internal interfit, and a rubber elastic body, fixedly attached to said outer peripheral surface of said inner cylindrical body, for connecting together said inner and outer cylindrical bodies, wherein said rubber elastic body includes an interfit fixing portion which is fixed to an inner peripheral surface of said outer cylindrical body by internal interfit and at least one projecting portion which becomes radially convex from said inner cylindrical body toward said outer cylindrical body are formed, said interfit fixing portion and said projecting portion being provided at different positions in the cylinder axis direction, and wherein said outer cylindrical body includes a recessed portion, which becomes concave correspondingly to the shape of said projecting portion with a clearance of a given amount left between said recessed portion and said projecting portion, is provided at a position of said inner peripheral surface of said outer cylindrical body corresponding to the position of said projecting portions, wherein said projecting portion and said recessed portion are engaged with each other when said inner cylindrical body and said outer cylindrical body relatively rotate about the cylinder axis or relatively displaced in a radial direction.

2. The shift lever bush of claim 1, wherein said recessed portion of said outer cylindrical body is formed by a pair of recesses which are circumferentially spaced from each other by a given distance in said outer peripheral surface of said outer cylindrical body and which are so recessed as to respectively project toward said inner peripheral surface of said outer cylindrical body, wherein said inner cylindrical body is inserted to the inside of said outer cylindrical body, with said rubber elastic body fixedly mounted to said inner cylindrical body, and wherein during said insertion said interfit fixing portion of said rubber elastic body is interfittingly fixed, by press fit, to said inner peripheral surface of said outer cylindrical body, wherein said interfit fixing portion is formed at an end of said rubber elastic body on the side of a base end thereof in the direction of said insertion of said inner cylindrical body into said outer cylindrical body, and wherein said rubber elastic body further includes an introduction portion, which becomes radially convex from said inner cylindrical body toward said outer cylindrical body and the amount of projection of which is smaller than that of said projecting portion, is provided at a position of said rubber elastic body located nearer to the side of a leading end of said inner cylindrical body in said insertion direction than said projecting portion.

* * * * *

UNITED STATES PATENT AND TRADEMARK OFFICE
CERTIFICATE OF CORRECTION

PATENT NO. : 6,783,297 B2
DATED : August 31, 2004
INVENTOR(S) : Osamu Hashimoto, Yoshihito Hiraiwa and Kenji Nishikawa It is certified that error appears in the above-identified patent and that said Letters Patent is hereby corrected as shown below:

Column 10,
Line 14, "portions" should read -- "portion" --.

Signed and Sealed this

Twenty-eighth Day of December, 2004

JON W. DUDAS
*Director of the United States Patent and Trademark Office*